United States Patent
Medeiros

[11] Patent Number: 5,812,494
[45] Date of Patent: Sep. 22, 1998

[54] WIDE-ANGLE, FORWARD-LOOKING BATHYMETRIC MAPPING

[75] Inventor: Michael R. Medeiros, Tiverton, R.I.

[73] Assignee: The United States of America as represented by the Secretary of the Navy, Washington, D.C.

[21] Appl. No.: 867,056

[22] Filed: Jun. 2, 1997

[51] Int. Cl.$^6$ .................................................. G01S 15/89
[52] U.S. Cl. .............................. 367/88; 367/103; 367/119
[58] Field of Search ............................... 367/88, 103, 119

[56] References Cited

U.S. PATENT DOCUMENTS

| 4,815,045 | 3/1989 | Nakamura | 367/88 |
| 4,939,700 | 7/1990 | Breton | 367/88 |

*Primary Examiner*—Ian J. Lobo
*Attorney, Agent, or Firm*—Michael J. McGowan; William F. Eipert; Prithvi C. Lall

[57] ABSTRACT

A system for generating a wide-angle, forward-looking bathymetric map of the an region ensonified by single ping. A transmitter generates a large angle transmit pulse. An array of acoustic transducer elements operates to transmit the pulse, receive acoustic return signals and convert the returns into digital acoustic data. A receiver matched filters, shades and steers the data through a series of horizontal angles. For each horizontal angle steered to, the receiver generates vertical beams and identifies detections as those vertical beams having magnitudes greater than a detection threshold. Vertical beam forming and detection identification is repeated for each time slice in a series of time slices over the ping cycle. The identified detections are refined using a curve fitting analysis and stored in equal angular vertical bins. A bottom profile is generated from the refined angles and magnitudes. The profile is filtered to remove outliers in magnitude and space to obtain a bottom map for the horizontal steering angle. The bottom maps from each horizontal angle are compiled into a single wide-angle, forward-looking map.

20 Claims, 5 Drawing Sheets

WIDE-ANGLE, FORWARD-LOOKING BATHYMETRIC MAPPING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a system for generating bathymetric maps for use in vehicle navigation and object localization and avoidance. More specifically, the present invention relates to system and method for processing element-level forward looking acoustic array data to generate a wide-angle, forward looking bathymetric map from a single ping.

2. Description of the Prior Art

There are many possible uses for accurate, wide-angle, forward looking bottom maps. Such maps are useful as navigational aids as well as for obstacle avoidance and object localization, thereby increasing safety for a wide range of vehicles, especially in shallow water areas. Additionally, such maps are critical for navigational guidance and control of autonomous underwater vehicles (AUVs). AUVs can be used to perform rapid underwater searches over large areas and reduce or eliminate the risk to human lives, particularly in hostile environments.

Single-beam, downward-looking acoustic fathometers have been in existence for many years. These fathometers transmit an acoustic pulse and listen for its echo from the bottom. The time it takes for the sonar pulse to travel to the bottom and return dictates the range to the bottom. There are two main disadvantages associated with single-beam fathometers. First, these fathometers only provide an estimate of the bathymetry directly under the survey craft therefore, it takes many traversals of an area under inspection to collect enough data to form a bathymetric map. Second, the estimates of depth under the survey craft are not helpful for obstacle avoidance, where one needs an estimate of bathymetry ahead of the craft.

Multi-beam, downward-looking, wide swath bathymetric sonars offer an improvement over single-beam fathometers by providing an estimate of bathymetry over an across-track swath under the survey craft. Thus, fewer survey lanes are needed to produce an adequate bathymetric map. However, these sonars still do not serve as an aid to forward-looking navigation.

Inexpensive forward-looking sonars for bathymetry have recently been made available for consumer use. These new sonars display a single, ahead-looking, vertical cross-section where received echo strengths are encoded with gray levels. The sonar operator interprets the display to discriminate bottom returns from objects that are in the water column. The disadvantages to these forward-looking sonars are that an operator is required to perform object discrimination (precluding their use on an autonomous vehicle), and only a single vertical cross-section is displayed, thus making it difficult to choose the best steering direction for detected obstacle avoidance.

Split-aperture based, ahead-looking, sonars have been used by the military on underwater vehicles for object localization and navigation. These sonars include software for automated bottom discrimination. However, since the systems are split-aperture based, only one depth estimate per range cell can be obtained. These systems have been shown to work well in deeper water where the boundaries (surface and bottom) are far apart. In shallow waters, boundary interaction causes performance degradation.

Thus what is needed is a system, which does not require operator intervention or interpretation, that can provide an accurate bottom map for a wide area ahead of a vehicle.

SUMMARY OF THE INVENTION

Accordingly, it is a general purpose and object of the present invention to provide a system and method for generating wide-angle, forward-looking bathymetric maps.

A further object of the present invention is the provision of a system that can generate wide-angle, forward-looking bottom maps in shallow water.

Yet a further object of the present invention is to provide a system and method for generating wide-angle, forward-looking bathymetric maps from a single acoustic ping.

These and other objects made apparent hereinafter are accomplished with the present invention by providing an array of acoustic transducer elements connected to transmitter and receiver. The transmitter generates a large angle transmit pulse. The array operates to receive return signals and convert them into digital acoustic data. The receiver uses the data from the array to generate a bathymetric map for each transmitted ping. The receiver matched filters, shades and steers the data through a series of horizontal angles. For each horizontal angle steered to, the receiver generates vertical beams and identifies detections in those vertical beams whose magnitudes are greater than a detection threshold. The vertical beam forming is performed for each time slice in a series of time slices over the ping cycle. The detections are refined using a curve fitting analysis and stored in equal angular vertical bins. A bottom profile is generated from the refined angles and magnitudes. This profile is then filtered to remove outliers in both magnitude and space to generate a bottom map for the horizontal steering angle. The bottom maps from each horizontal angle are compiled into a single wide-angle, forward-looking map.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
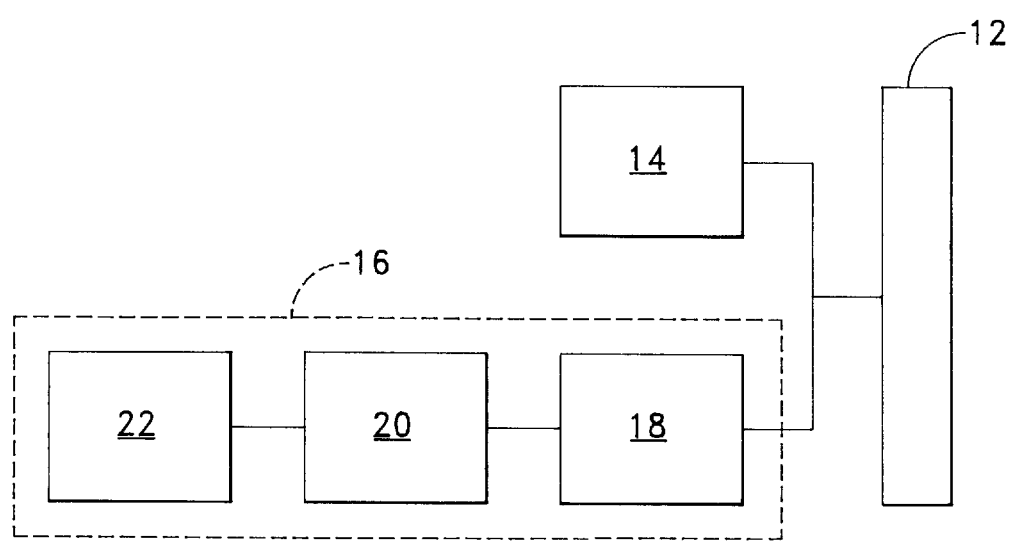
FIG. 1 is a diagram of a sonar system for wide-angle, forward-looking, multibeam bathymetry estimation.

Referring now to FIG. 1, there is shown a diagram of a bathymetric sonar system 10 for wide-angle, forward-looking, multibeam bathymetry estimation in accordance with the present invention. However, while the present invention will be described relative to a specific embodiment for system 10, it is to be understood that the novel features of the invention are applicable and easily adapted to and any number of systems and embodiments.

System 10 comprises a planar array 12 of acoustic transducer elements (not shown) connected to transmitter 14 and receiver 16. Transmitter 14 generates signals which cause a selected subset of transducer elements within array 12 to generate an acoustic signal having a desired bandwidth, duration and transmit beam pattern. After the desired acoustic signal has been transmitted, array 12 operates to receive acoustic signals sensed at selected transducer elements and to convert these signals into digital acoustic data which are passed to receiver 16.

Receiver 16, which comprises beamformer 18, detection processor 20 and mapping processor 22, receives the data from array 12 and processes the data to generate a bathymetric map for each transmitted ping. At each received time sample the received acoustic data are matched filtered, shaded with two dimensional weights, and electronically steered, using phase delays or the like, to a particular azimuth angle by beamformer 18. Vertical beamforming is then performed with a spatial Fast Fourier Transform by beamformer 18. The beamformed data are then passed to detection processor 20.

Detection processor 20 identifies detections in the data passed from beamformer 18. Detections are identified as those vertical beams whose corresponding magnitudes are greater than a detection threshold, Detection processor 20 then refines the detection angles and magnitudes using a curve fitting analysis technique for each detection identified. The refined angles, magnitudes and corresponding sample numbers are stored in equal angular bins. Only the maximum refined detection magnitude response along with the corresponding refined angle and sample number is retained in each equal angular bin by processor 20.

After detection processor 20 has processed all of the received data, mapping processor 22 generates a bottom map from the refined angles and magnitudes. For each azimuthal angle, processor 22 converts the refined vertical angles and sample numbers to a depth versus range profile. This profile is then filtered to remove outliers in both magnitude and space.

In operation, system 10 generates a bottom map for an entire ensonified region from a single ping. The beam should be large enough in the vertical to fully ensonify the bottom and water column. Additionally, it is desirable, to have a large horizontal beam so that each sonar ping maps a large area in azimuth, thus providing more information per ping. Furthermore, since phase-delay beamforming is performed by beamformer 18, the transmit pulse must be narrow band. Additionally, to minimize blanking time (the time in which the transmitter is on and the receiver pre-amplifiers are off, thus the sonar is 'blind') a short pulse should be used. Longer pulses can be used in deeper water. It has been found that a linear stepped, frequency modulated (LFM) waveform using the widest bandwidth possible has yielded the best results.

In describing the operation of system 10 and, more particularly receiver 16, it will be assumed that transmitter 14 provides a 30° vertical (±15° relative to array boresight) and 80° horizontal (±40° relative to array boresight) transmit beam, measured at the half-power points. Transmitter 14 generates this large-angle transmit beam in a known manner.

After transmitter 14 generates the transmit pulse, array 12 operates in a receive mode and begins sensing acoustic signals received at the face of the array. Received element-level acoustic data from a forward-looking sensor are required for beamforming in both azimuth and elevation. The receive beams should be as narrow as possible for accurate detection localization. For purposes of discussion, it will be assumed that array 12 provides 512 randomly selected elements from a 40 element by 40 element, square, planar array. Array elements are spaced on half-wavelength centers. With this configuration, array 12 provides 30 receive beams, measured at the half-power points. In addition to analog-to-digital conversion the array hardware also basebands and down samples the received acoustic data, although this could be done in software.

The received acoustic data from array 12 are passed to receiver 16 for processing to generate a bathymetric map. The operation of receiver 16 will be described with additional reference to FIG. 2 in which is shown a functional flow diagram illustrating the processing steps performed by receiver 16 for wide-angle, forward-looking bathymetry estimation in accordance with the present invention. In describing the processing method illustrated in FIG. 2, reference to the transmit beam, the number of receive elements and the array geometry reflect the parameters described above in reference to FIG. 1. However, as will be readily apparent to those skilled in the art, these parameters can easily be modified to suit nearly any transmit beam and array configuration.

Figure 2:
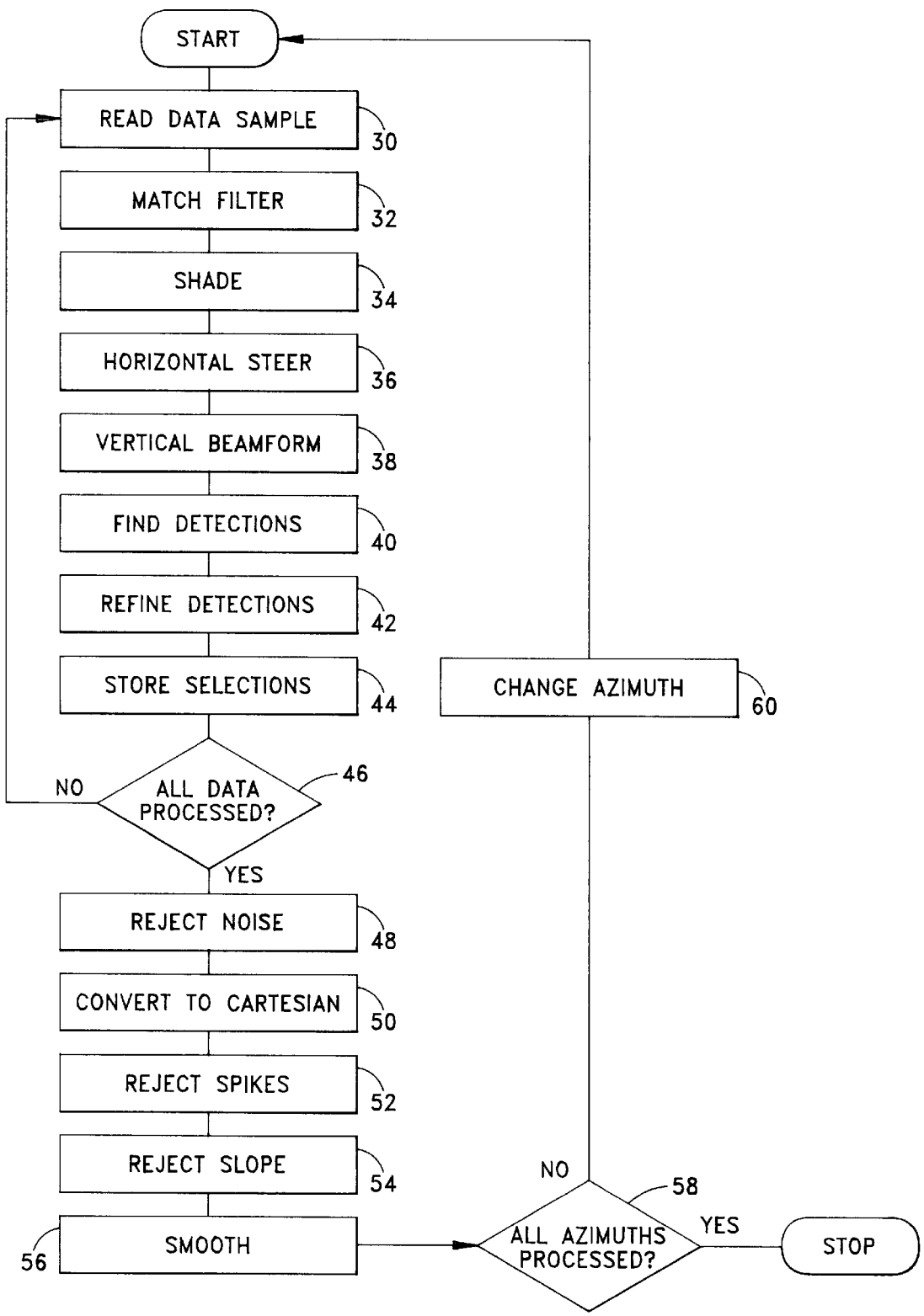
FIG. 2 is a functional flow diagram illustrating the processing steps of a method for wide-angle, forward-looking bathymetry estimation in accordance with the present invention.

Referring now to FIG. 2, a bottom map is generated for the entire ensonified region by processing one azimuthal angle at a time. In processing the received acoustic data, each of the processing steps shown in blocks 30 through 44 is executed once for each time slice processed. This series of processing steps, blocks 30 through 44, is then repeated for each consecutive time slice in the series of times slices over the entire ping cycle. After all of the time slices for the ping cycle have been processed, processing steps 48 through 56 generate a bathymetric map for the current azimuthal angle. The entire process (blocks 30 through 56) is repeated for each azimuthal angle ensonified. As illustrated in FIG. 2, steps 30 through 38 correspond, generally, to the functions performed by beamformer 18, steps 40 through 44 generally identify the processing functions performed by detection processor 20 and steps 48 through 56 generally correspond to the bathymetric mapping processing functions performed by mapping processor 22.

In read data sample block 30, a single, complex-valued data. sample for each selected receive element within array 12 corresponding to the time slice to be processed is retrieved from the received acoustic data. All system gains are removed from the retrieved acoustic data samples such that these incoming data values represent relative pressure at the face of array 12 referenced to 1 micropascal. System gains applied by array 12 include receive voltage sensitivity, analog preamplifier gain, receive gain (which can be time varying), analog-to-digital converter gain, and digital basebanding filter gain.

In match filter block 32, the incoming data value for each element is matched filtered by applying a complex-valued, unity norm, basebanded digital replica of the transmit waveform to the incoming data. This matched filter can be implemented in a known manner with a Fast Fourier Transform (FFT) overlap-add filter or the like. Transients introduced during filter loading are removed.

In shade block 34, the matched filtered data is shaded to limit first sidelobe levels to −30 decibels (dB) relative to the mainlobe response. Beamformer 18 can accomplish this shading by applying an array of two-dimensional weights such as Chebyshev weights to the match filtered data.

The processing in horizontal steer block 36, steers the filtered data to selected horizontal angles (steered in azimuth). Complex phase delays are applied to each of the selected elements in order to steer the array to a given azimuth. The elements in each row are then summed to form horizontal staves with each stave being steered to the same azimuthal angle. In array 12 of this example, 40 horizontal staves will be formed each of which are steered to the same azimuthal angle.

In vertical beamform processing block 38 a set of vertical beams are formed using a spatial FFT beamformer. The array gain introduced by summing the shaded receive elements is removed, and the complex-valued pressure outputs are squared to provide beam powers. For array 12 of system 10, beamformer 18 generates 256 vertical beams and thus provides 256 beam powers for each horizontal angle to which array 12 is steered.

After beamformer 18 has generated the 256 beam powers for a selected azimuthal angle for the time slice being processed, detection processor 20 begins its processing functions with find detections block 40. For each time slice received from beamformer 18, a reference level for the current time slice is computed as the average beam power across the 256 vertical beams. Detections are initially identified as any vertical beam whose beam power exceeds a detection threshold. The detection threshold used with array 12 is set to 6 dB above the reference level. After all the initial detections have been identified, detection peaks are found from the set initial detections. Detection peaks (local detection maxima) are those beams whose beam power is larger than the power of their immediate neighbors.

In refine detections processing block 42 the detection peaks identified in find detections block 40 are refined to obtain an accurate detection angle and detection beam power for each peak. The detection peaks are refined by using a curve fitting technique to identify a curve which passes through the peak and the beam powers for one or more neighboring beams on each side of the peak. The fitted curve can then be analyzed to obtain an accurate vertical angle and beam power. For example, fitting a least squares parabola to the detected peak power and the two powers on either side of that peak, setting the derivative of the resultant fitted second-order equation defining the fitted curve to zero and solving for angle yields the refined peak angle estimate for that detection peak. Substitution of the refined peak angle estimate into the fitted equation yields the refined power estimate. The refined angle and refined peak power along with a corresponding sample number are passed to store detections block 44. The corresponding sample number identifies the time slice in which the refined angle and peak power were identified. Thus, the sample number indicates the time from transmit to detection and allows a determination of range to the detection.

In store detections block 44 the refined power estimate for each of the refined angles obtained in block 42 is compared with the maximum power response stored in the corresponding bin of a number of equal angular vertical bins spanning ±90°. If the refined peak power estimate is greater than the maximum power response stored in the bin, the refined peak power along with its corresponding refined angle and sample number are stored in the bin. If the refined peak power estimate is less than the power response currently stored in the corresponding angular bin, the refined peak power estimate is discarded. Thus, only the maximum power response obtained for each angular bin is maintained.

Any number of equal angular vertical bins can be used to store the maximum power responses. Generally, as the number of bins used increases, the more accurate the bottom map will be. However, when selecting the number of bins, consideration should be given to the number of vertical beams generated in block 38 and the accuracy obtained by the curve fitting analysis.

In some applications, the transmit beam may not provide full vertical angle coverage (±90°) across the entire beam. Therefore, the maximum allowable downward vertical angle to store may be dictated by the transmit beam coverage. Recall that transmitter 14 provides a 30° vertical (±15° relative to array boresight) and 80° horizontal (±40° relative to array boresight) transmit beam. Attempts to extract valid bottom echoes well outside the transmit beam (in either azimuth or elevation) yield poor results. Table 1 shows the values of the maximum allowable vertical angle as a function of azimuth angle used for system 10.

TABLE 1

| AZIMUTH ANGLE, θ | MAXIMUM VERTICAL ANGLE |
|---|---|
| $-40° \leq \theta < -38°$ | 35° |
| $-38° \leq \theta < -34°$ | 40° |
| $-34° \leq \theta < -30°$ | 45° |
| $-30° \leq \theta \leq 30°$ | 50° |
| $30° < \theta \leq 34°$ | 45° |
| $34° < \theta \leq 38°$ | 40° |
| $38° < \theta \leq 40°$ | 35° |

As previously indicated, the processing performed in blocks 30 through 44 is repeated for each consecutive time sample over an entire transmit cycle until all time slices over a sonar transmit cycle have been processed and the refined detections from each time slice have either been stored into one of the equal angular vertical bins or discarded. Block 46 determines if the data from an entire transmit ping has been completed. If the data from an entire ping cycle has not been processed, the processing functions performed in blocks 30 through 44 are repeated. If an entire ping cycle has been processed, data stored in the equal angular vertical bins are passed to processing blocks 48 through 56 where the data are mapped and filtered to remove outliers in both magnitude and space.

Reject noise processing block 48 filters the data in equal angular bins to remove noise. Noise is filtered from the data using a moving average filter. A window consisting of the stored power response from the bin under inspection and the power response from at least one bin on either side is run along the equal angular bins, starting from the maximum stored downward angle and proceeding to the minimum stored angle. If the power of the point under inspection is more than 10 dB lower than the mean power of the bins within the window, the point is considered noise, and rejected from the profile. System 10 uses a nine sample moving average filter (four points on each side of the point under inspection).

Figure 3A:
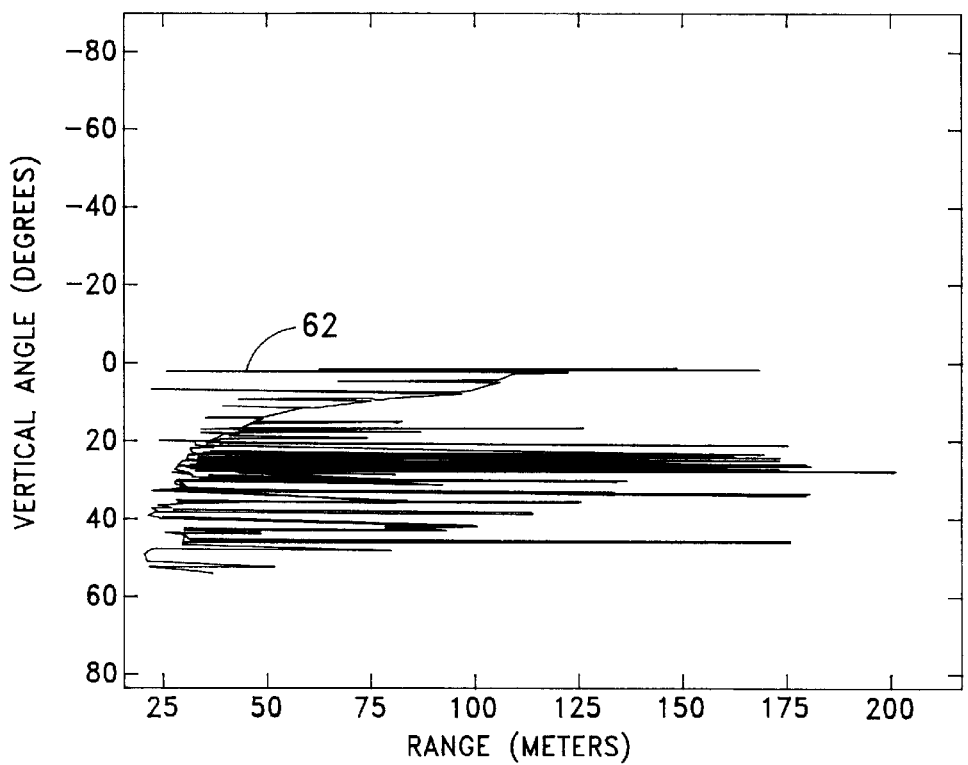
FIGS. 3A and 3B illustrate detection profiles for bottom detection angles versus detection range before and after noise rejection processing.
Figure 3B:
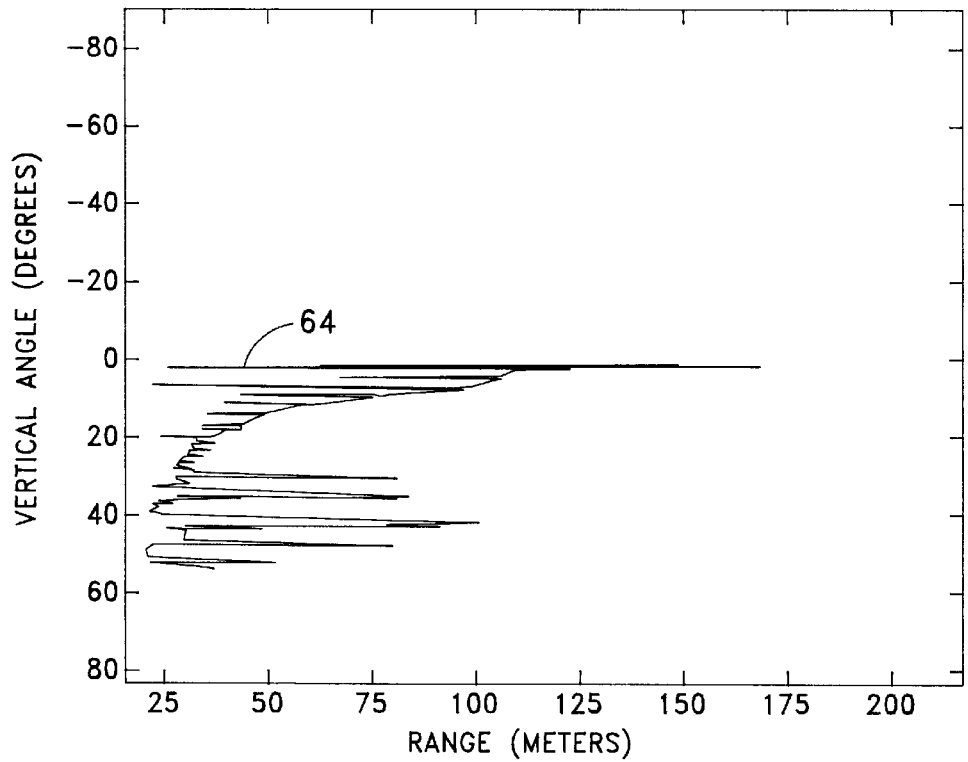

FIGS. 3A and 3B illustrate a detection profile before and after noise rejection. In FIG. 3A plot 62 illustrates the stored refined bottom detection angles versus detection range. The detection range is determined from the sample number in a known manner. As can be seen from FIG. 3A, the bottom profile is cluttered with outliers caused by noise (volume reverberation and sidelobe returns). In FIG. 3B plot 64 illustrates the resulting bottom profile after noise rejection was performed on plot 62 of FIG. 3A.

Referring again to FIG. 2, processing block 50, convert to Cartesian, converts the stored, noise rejected, detection profile is converted from vertical angle versus sample number to a bottom profile showing depth versus horizontal range. Block 50 also determines the overall slope of the bottom profile (via a linear fit) for later use in slope rejection. Two methods have been employed to perform the conversion. The first conversion method simply divides the sample number by the sample frequency (Hz), adds the transmit-receive delay (seconds), multiplies by a given sound velocity (1500 meters/second is the default) and divides by two (the sound must propagate out, hit a target, and then return) to determine a calculated range (meters) to the target. The calculated range and the stored refined vertical angle are then used to determine both the horizontal range (meters) and the depth below the sonar (meters) to the target. Assuming straight-line propagation of the acoustic energy to the target and back, the horizontal range equals the calculated range multiplied by the cosine of the refined vertical angle. Similarly, the depth below the sonar equals the calculated range multiplied by the sine of the vertical angle.

However, underwater acoustic ray refraction due to variations in the sound velocity as a function of depth is common. Therefore, a second conversion method uses the sample number and the vertical angle as indices into a precomputed ray table. The ray table holds depth below the sonar (meters) and range from the sonar (meters) as functions of sample number and vertical angle. Using the depth below the sonar $D_s$, and range from the sonar $R_s$ obtained from the ray table, the horizontal range $R_H$ from the sonar is given by $R_H = \sqrt{R^2_s - D^2_s}$.

Generating a set of rays that predict the underwater acoustic propagation between the two points is well known, and essentially requires solving a reduced wave equation using one of several ray-based acoustic wave-evaluation models such as the multipath expansion eigenray model, the FACT eigenray model, the RAYMODE eigenray model, or the like. The ray tracing table can be generated using any number of applications known in the art. In system 10, a ray table was generated using a third-order Runge-Kutta numerical integration of the ray equations as a function of time, where the time step was the sample period.

Figure 4:
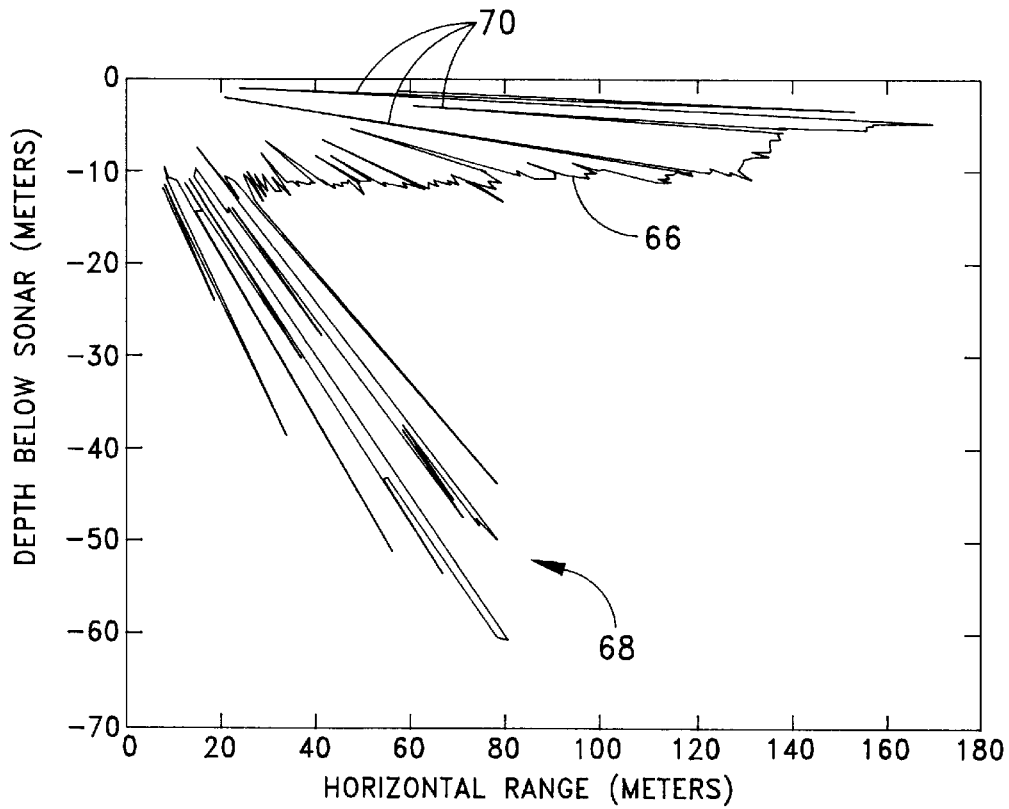
FIG. 4 illustrates a bottom profile generated by converting a detection profile to depth versus horizontal range.

The ray correction conversion method, although more accurate than the straight-line propagation method, is more computationally intensive. In situations where the sound velocity as a function of water depth is nearly constant (isovelocity) the straight-line propagation conversion method provides results comparable to the ray corrected results. FIG. 4 shows a plot 66 which illustrates the bottom profile of FIG. 3B after conversion to depth below the sonar versus horizontal range.

In reject spikes block 52, spikes within the converted bottom profile are removed. In FIG. 4 the converted bottom profile, plot 66, shows a nearly flat bottom 12 meters below the sonar depth. Additionally, a rim approximately 120 meters from the sonar can also be identified. However, the profile is contaminated by single sample spikes 70 due to volume reverberation (spikes pointing toward the sonar) and sidelobe noise (spikes pointing away from the sonar). Noise spikes 68 are especially prevalent in the area close to the sonar, where the transmit beam is weak. The near source profiling can be improved by transmitting a beam having a larger vertical coverage than the 30° vertical beam generated by transmitter 14.

Figure 5:
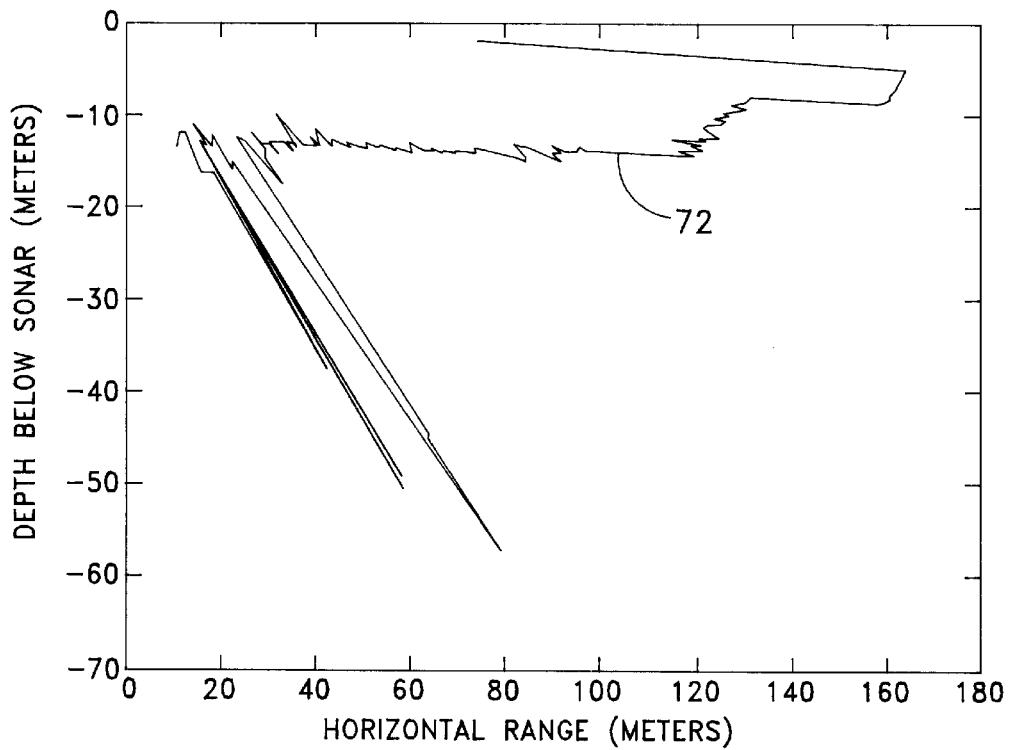
FIGS. 5, 6 and 7 show bottom profiles after spike removal, slope rejection and profile smoothing, respectively.

Filtering the noise from the converted bottom profile (spike removal) is accomplished by running a moving comparitor filter along the profile. The comparitor filter inspects each horizontal range point along with several samples before and after the point under inspection. System 10 compared each point to the three neighboring points to either side. If the horizontal range to the point under inspection is greater than, or less than that of its immediate neighbors, the point is rejected as a spike. FIG. 5, depicts the example bottom profile after spike removal. As can be seen in plot 72 of FIG. 5, most of the noise spikes 68 of FIG. 4 have been removed.

Figure 6:
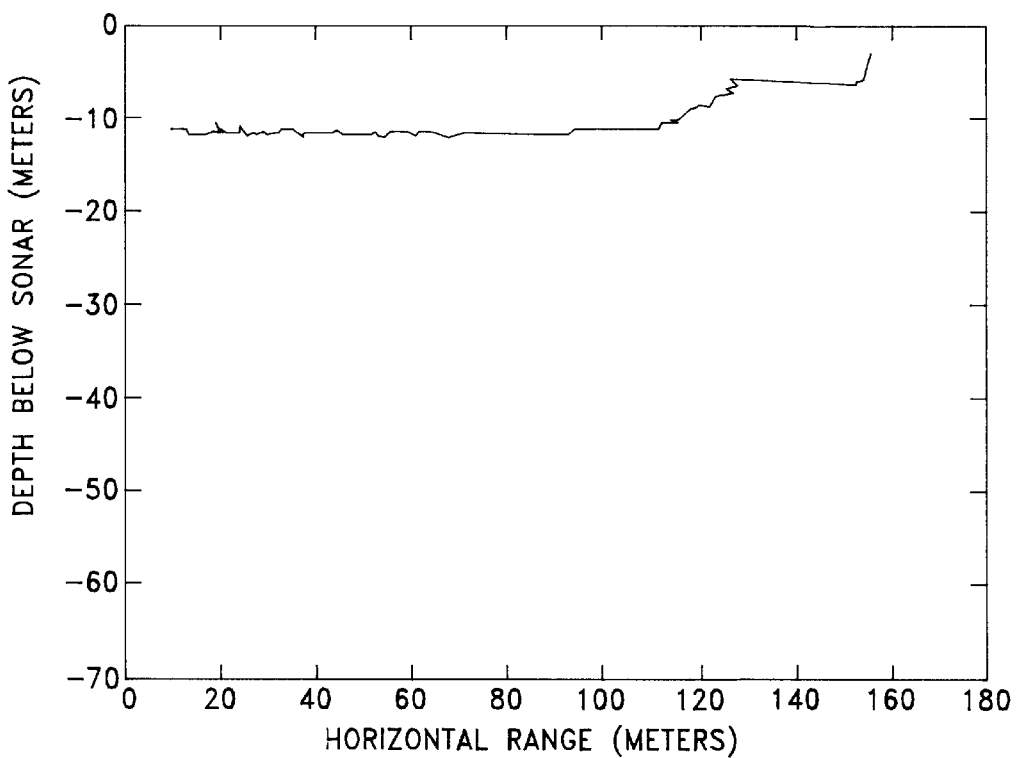

After the spike removal processing of block 52, reject slope processing block 54 is executed. In reject slope processing, the point-to-point slope is computed between each pair of points in the bottom profile. If the slope differs from the overall slope (computed in above in block 50) by more than a preset slope threshold, a rejection flag is set. If the slope differs from the overall slope by more than preset trend threshold but less than the slope threshold, the profile is examined for an upward or downward trend. If a directional trend exists the rejection flag is not set. If a directional trend does not exist, the rejection flag is set. System 10 used a slope threshold of 60° and a trend threshold of 30°. After all points have been examined, those points having a rejection flag set are re-examined. If the rejection flag has been set, the rejected depth point and the previous 9 depth points are averaged. The depth point furthest from the mean is identified as a slope rejection point and rejected (removed) from the profile. The example bottom profile after slope rejection is presented in FIG. 6.

Figure 7:
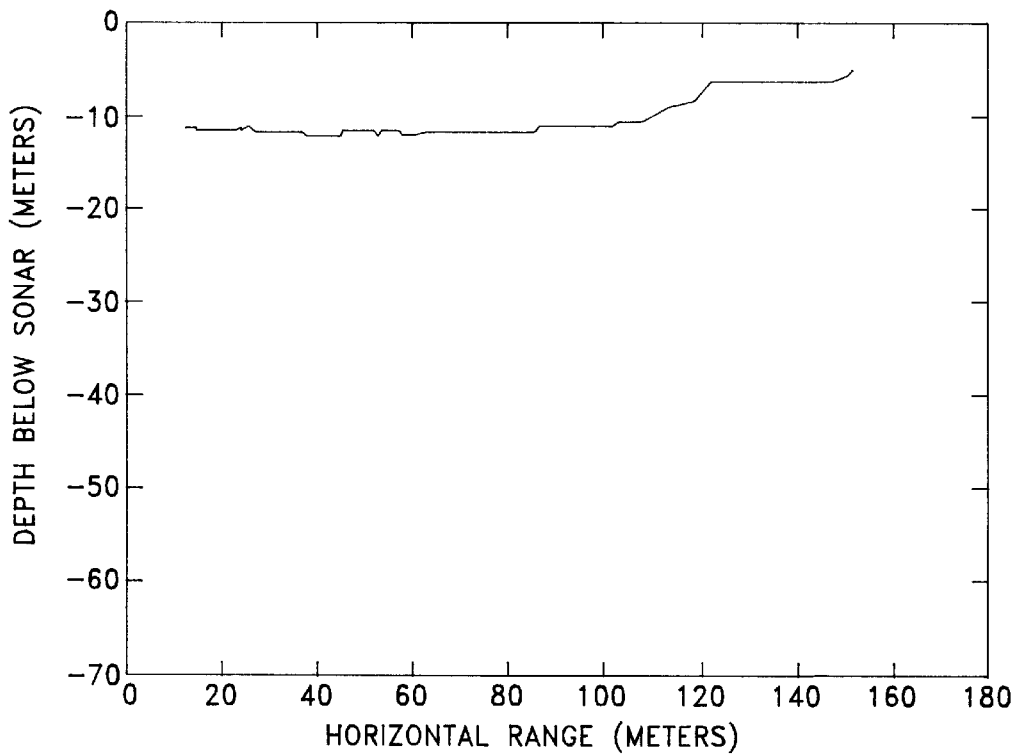

After slope rejection processing is complete, block 56 smoothes the profile using a sliding, mean filter. The mean filter replaces every three points with the mean of these three points. The example bottom profile after smoothing is shown in FIG. 7. After the bottom profile has been smoothed, processing for current azimuthal angle is complete. Block 58 determines if more azimuthal angles need to be processed. If more azimuthal angles remain to be processed, block 60 increments the steering angle and the processing functions of blocks 30 through 56 are repeated. Recall that the test sonar had a ±40° horizontal transmit beam, and a 3° wide receive beam. Using azimuth angles from −40° to +40° in 2° increments covers the transmit angular swath with adequate spacing to minimize scalloping loss. After all azimuthal angles have been processed, the smoothed bottom profiles from each angle are processed, in a known manner, to generate a single wide-angle, forward-looking bottom map.

Obviously, many modifications and variations of the present invention may become apparent in light of the above teachings. For example, the number of processing steps can decreased by using a preprocessor to perform matched filtering and shading functions since these steps need only be performed once to the incoming data. Additionally, by using FFT based steering for both the horizontal and vertical the system can be used to quickly identify areas of interest which can then be more accurately mapped using the method described above. Furthermore, vertical beam steering can be accomplished via phase delays to provide more directivity in steering the vertical angles.

The present invention provides a novel approach for generating an accurate wide-angle, forward-looking bathymetric map and offers several significant advantages over prior art systems. First, the present invention generates in real time a wide-angle, forward looking bottom map. Such a map can be used as an aid to navigation, for object avoidance and for terrain mapping. Secondly, the present invention can generate accurate bottom maps in shallow waters which further enhances it use for navigation and object avoidance. Furthermore, the present invention maps a large area from a single ping.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for generating a bathymetric map of a region ensonified by an acoustic signal comprising to steps of:

receiving return acoustic signals from the ensonified region;

steering the received acoustic signals to a selected horizontal angle;

generating a set of vertical beams steered to said selected horizontal angle for each time slice in a series of time slices;

identifying, within each set of vertical beams generated, a detection beam having a magnitude greater than a detection threshold;

converting said detection beam to a depth value and a horizontal range value; and generating a bathymetric map using said depth and horizontal range values.

2. The method of claim 1 wherein said detection beam has a detection peak, a detection angle and a time slice identifier and further including the steps of:

refining the detection peak and detection angle; and storing the refined detection peak, the refined detection angle and the time slice identifier for the detection beam having the greatest refined detection peak for a selected range of detection angles in a corresponding angular bin of a set of angular bins.

3. The method of claim 2 further including the step of filtering the refined detection peaks stored in the set of angular bins using a moving average filter.

4. The method of claim 3 wherein the step of generating a map using said depth and horizontal range values comprises the steps of:

generating a bottom profile from said depth and horizontal range values; and filtering noise from the bottom profile by running a moving comparitor filter along the profile.

5. The method of claim 4 further including the step of identifying and removing slope rejection points from the bottom profile.

6. The method of claim 5 further including the step of smoothing the bottom profile.

7. The method of claim 4 wherein the step of converting said detection beam to depth and horizontal range comprises the steps of:

determining a target range using the time slice identifier and the frequency of the received acoustic signal; and calculating the depth and horizontal range values using the target range and the refined detection angle.

8. The method of claim 4 wherein said detection angle and time slice identifier are converted to the depth and horizontal range values using a precomputed ray table.

9. The method of claim 1 wherein the step of generating a bathymetric map using said depth and horizontal range values comprises the steps of:

generating a bottom profile from the depth and horizontal range values; and filtering noise from the bottom profile by running a moving comparitor filter along the profile.

10. The method of claim 9 further including the step of identifying and removing slope rejection points from the bottom profile.

11. The method of claim 10 further including the step of smoothing the bottom profile.

12. A method for generating a bottom map of a region ensonified by an acoustic signal comprising:

receiving return acoustic signals and converting said received acoustic signals into acoustic data;

steering said acoustic data to a selected horizontal angle;

generating a set of vertical beams steered to said selected horizontal angle;

identifying detection beams having magnitudes greater than a detection threshold in said set of vertical beams; and generating a bathymetric map from said detection beams.

13. The method of claim 12 wherein said step of generating a bathymetric map comprises the steps of:

converting said detection beam to a depth value and a horizontal range value;

generating a bottom profile from the depth and horizontal range values; and filtering noise from the bottom profile using a moving comparitor filter.

14. The method of claim 13 wherein said step of generating a bathymetric map further comprises the steps of:

identifying and removing slope rejection points from the bottom profile; and smoothing the bottom profile.

15. The method of claim 12 wherein said detection beam has a detection peak, a detection angle and a time slice identifier and further including the steps of:

refining the detection peak and detection angle; and filtering the refined detection peaks using a moving average filter.

16. A system for generating a bottom map of a region ensonified by an acoustic signal comprising:

an array for receiving return acoustic signals and converting said received acoustic signals into acoustic data;

a beamformer for steering said acoustic data to a selected horizontal angle and for generating a set of vertical beams steered to said selected horizontal angle;

a detection processor for identifying detection beams having magnitudes greater than a detection threshold in said set of vertical beams; and a mapping processor for generating a bathymetric map from said detection beams.

17. The system of claim 16 wherein said mapping processor comprises:

means for converting said detection beam to a depth value and a horizontal range value;

means for generating a bottom profile from the depth and horizontal range values; and moving comparitor filter means for filtering noise from the bottom profile.

18. The system of claim 17 wherein said mapping processor further comprises:

means for identifying and removing slope rejection points from the bottom profile; and means for smoothing the bottom profile.

19. The system of claim 18 wherein said detection processor identifies a detection peak, a detection angle and a time slice identifier for each detection beam.

20. The system of claim 19 wherein said detection processor further comprises:

means for refining the detection peak and detection angle; and a moving average filter for filtering the refined detection peaks.

* * * * *